US010150855B2

(12) United States Patent
Roncaglia et al.

(10) Patent No.: US 10,150,855 B2
(45) Date of Patent: Dec. 11, 2018

(54) ENHANCED POLYCARBONATE EXTRUSION GRADES

(71) Applicant: SABIC GLOBAL TECHNOLOGIES B.V., Bergen op Zoom (NL)

(72) Inventors: Marco Roncaglia, Murcia (ES); Ignacio Vic Fernandez, Murcia (ES); Rein Mollerus Faber, Bergen op Zoom (NL); Christianus Johannes Jacobus Maas, Zeeland (NL); Cornelis Jan Maria Rijken, Bergen op Zoom (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 205 days.

(21) Appl. No.: 15/111,929

(22) PCT Filed: Mar. 4, 2015

(86) PCT No.: PCT/IB2015/051583
§ 371 (c)(1),
(2) Date: Jul. 15, 2016

(87) PCT Pub. No.: WO2015/132740
PCT Pub. Date: Sep. 11, 2015

(65) Prior Publication Data
US 2016/0362537 A1 Dec. 15, 2016

(30) Foreign Application Priority Data
Mar. 6, 2014 (EP) .................................... 14382081

(51) Int. Cl.
| | |
|---|---|
| C08K 5/103 | (2006.01) |
| C08K 5/11 | (2006.01) |
| C08L 69/00 | (2006.01) |
| B29C 47/68 | (2006.01) |
| B29C 47/00 | (2006.01) |
| B29C 47/06 | (2006.01) |
| C08J 5/18 | (2006.01) |
| C08K 5/3475 | (2006.01) |
| C08K 5/00 | (2006.01) |
| C08G 64/40 | (2006.01) |
| B29K 69/00 | (2006.01) |

(52) U.S. Cl.
CPC ........ C08K 5/3475 (2013.01); B29C 47/0004 (2013.01); C08G 64/406 (2013.01); C08J 5/18 (2013.01); C08K 5/005 (2013.01); C08K 5/103 (2013.01); B29C 47/06 (2013.01); B29C 47/68 (2013.01); B29K 2069/00 (2013.01); C08J 2369/00 (2013.01); C08K 5/11 (2013.01); C08L 69/00 (2013.01)

(58) Field of Classification Search
CPC ........... C08K 5/103; C08K 5/11; C08L 69/00; B60Q 1/04–1/20; B29C 47/68
See application file for complete search history.

(56) References Cited

U.S. PATENT DOCUMENTS

| | | | |
|---|---|---|---|
| 4,460,752 A | 7/1984 | Neuray et al. | |
| 4,904,717 A | 2/1990 | Ho et al. | |
| 5,884,997 A * | 3/1999 | Stanuch ............... | B60Q 1/2611 340/472 |
| 5,973,102 A | 10/1999 | McCloskey et al. | |
| 6,008,280 A | 12/1999 | Krishnan et al. | |
| 6,359,042 B1 | 3/2002 | Anders et al. | |
| 6,555,646 B2 | 4/2003 | Volkers et al. | |
| 6,921,784 B2 | 7/2005 | Dohi et al. | |
| 7,084,233 B2 | 8/2006 | Miyamoto et al. | |
| 7,307,114 B2 | 12/2007 | Hachiya et al. | |
| 7,498,401 B2 | 3/2009 | Agarwal | |
| 7,786,246 B2 | 8/2010 | Jansen et al. | |
| 7,999,041 B2 | 8/2011 | Goossens et al. | |
| 8,133,564 B2 | 3/2012 | Kitayama | |
| 8,158,747 B2 | 4/2012 | Tanabe et al. | |
| 2004/0225047 A1 | 11/2004 | Hachiya et al. | |
| 2005/0215750 A1 | 9/2005 | Koga et al. | |
| 2007/0191518 A1 | 8/2007 | Chen et al. | |
| 2010/0099832 A1 | 4/2010 | Jansen et al. | |
| 2011/0128494 A1 | 6/2011 | Takahashi et al. | |
| 2012/0095139 A1 | 4/2012 | Yoshida et al. | |
| 2014/0093673 A1 | 4/2014 | Fernandez et al. | |

(Continued)

FOREIGN PATENT DOCUMENTS

| | | |
|---|---|---|
| EP | 0732360 A1 | 9/1996 |
| EP | 1187879 A1 | 3/2002 |

(Continued)

OTHER PUBLICATIONS

"Plastic Rubber Processing Aids," Shanxi Institute of Chemical Engineering, Chemical Industry Press Materials Science and Engineering, Aug. 2002, pp. 468 and 474-475, Second Edition.
CN 102443256 A; Machine Translation; Date of Publication Feb. 9, 2012; 26 pages.
European Search Report for European Application No. 14382081.9; Date of Completion: May 19, 2014; 5 pages.

(Continued)

Primary Examiner — Ramsey Zacharia
(74) Attorney, Agent, or Firm — Cantor Colburn LLP

(57) ABSTRACT

In an embodiment, a method for making a thermoplastic composition, comprising: melt polymerizing a polycarbonate, extruding and melt filtering the polycarbonate to form a melt filtered polycarbonate; forming the thermoplastic composition comprising the melt filtered polycarbonate, 0.03 to 0.05 wt % of a triacylglyceride release agent; and 0.10 to 0.14 wt % of a UV stabilizer; wherein the weight percentages are based on the total weight of the composition; and extruding the thermoplastic composition.

20 Claims, No Drawings

(56) References Cited

U.S. PATENT DOCUMENTS

| | | |
|---|---|---|
| 2014/0094545 A1 | 4/2014 | Roncaglia et al. |
| 2014/0094550 A1 | 4/2014 | Diaz et al. |
| 2014/0234629 A1 | 8/2014 | Sun et al. |
| 2014/0378591 A1 | 12/2014 | Fernandez et al. |

FOREIGN PATENT DOCUMENTS

| | | |
|---|---|---|
| EP | 1529632 A1 | 5/2005 |
| EP | 1268606 B1 | 8/2006 |
| EP | 2287655 A1 | 2/2011 |
| EP | 2418253 A1 | 2/2012 |
| EP | 2423262 A1 | 2/2012 |
| JP | S6081245 A | 5/1985 |
| JP | 2000143961 A | 5/2000 |
| JP | 2001226477 A | 8/2001 |
| JP | 2014118415 A | 6/2014 |
| JP | 2014118416 A | 6/2014 |
| JP | 2005068375 A | 3/2015 |
| KR | 1019990063015 A | 8/2006 |
| WO | 0015707 | 3/2000 |
| WO | 0073386 A1 | 12/2000 |
| WO | 2009052463 A1 | 4/2009 |
| WO | 2012141336 A1 | 10/2012 |
| WO | 2014049575 A2 | 4/2014 |

OTHER PUBLICATIONS

International Search Report for International Application No. PCT/IB2015/051583; International Filing Date Mar. 4, 2015; dated May 28, 2015; 4 pages.

JP 2000143961 A; Machine Translation; Date of Publication May 26, 2000; 20 pages.

JP 4290472 B2; Machine Translation; Date of Publication: Nov. 25, 2004; 28 pages.

Written Opinion of the International Search Report for International Application No. PCT/IB2015/051583; International Filing Date Mar. 4, 2015; dated May 8, 2015; 6 pages.

* cited by examiner

ENHANCED POLYCARBONATE EXTRUSION GRADES

CROSS REFERENCE TO RELATED APPLICATIONS

This application is a National Stage application of PCT/IB2015/051583, filed Mar. 4, 2015, which claims the benefit of European Application No. 14382081.9, filed Mar. 6, 2014, both of which are incorporated by reference in their entirety herein.

BACKGROUND

Polycarbonates are useful in a wide variety of applications in view of its good balance of properties, such as practical impact resistance, glass-like transparency, and moldability. In injection molding applications, effective mold release is a key property to enable efficient processing into formed articles. As such, a lower release force during the demolding of the parts is desirable. The lower release force can be achieved by adding a mold release agent to the thermoplastic composition. The release agent also helps to provide consistent processability.

Several materials, like polyesters, have the desired release performance. However, these materials have inferior mechanical properties, such as impact performance, compared to polycarbonate polymers. Further, these materials are difficult to process, as they have limited thermoformability for sheet applications and/or inadequate melt flow for injection molded parts.

An appropriate mold release not only facilitates processing, but should also be stable and inert during processing in such a way that it will not react with the polymer and other components, as well as preventing discoloring in time due to degradation. An appropriate mold release agent should not form deposits on the surface of the mold during injection molding nor on the roll calendar during extrusion processes and, therefore, become visible on the surface of the part causing aesthetic defects. Also, the additive should maintain transparency when required.

Conventional mold release agents, such as pentaerythrityl tetrastearate (PETS), provide acceptable release behavior in some applications. However, the release behavior is often not sufficient for relatively large parts or difficult profiles. The inadequate release behavior results in irregular processing or high release forces, possibly resulting in distortion of the ejected parts.

Further, it has been observed that polycarbonate profiles, during extrusion, can be affected by plate-out and vibrations can appear on the surface, generating issues on the overall product quality. Certain additive types have been found to be the root cause of these issues.

Processability and color stability/weatherability after extrusion are optimized by the use of some additives in the polycarbonate composition, such as release agents, antioxidants, and ultraviolet (UV) stabilizers. The use of those ingredients, in combination between them, provides a polycarbonate with good color stability after processing, improved light transmission and an optimal behavior during extrusion.

Accordingly, there remains a need for thermoplastic compositions that provide good release properties, while maintaining or improving other properties during processing. For example, there remains a need for thermoplastic compositions that have good release properties with lower release forces, improved color stability, and processability by extrusion, while avoiding any surface vibration or plate-out issues. This and other needs are satisfied by the various aspects of the present disclosure.

BRIEF DESCRIPTION

This disclosure relates generally to thermoplastic compositions, methods for making and articles using the same.

In an embodiment, a method for making a thermoplastic composition, comprising: melt polymerizing a polycarbonate, extruding and melt filtering the polycarbonate to form a melt filtered polycarbonate; forming the thermoplastic composition comprising the melt filtered polycarbonate, 0.03 to 0.05 wt % of a triacylglyceride release agent; and 0.10 to 0.14 wt % of a UV stabilizer; wherein the weight percentages are based on the total weight of the composition; and extruding the thermoplastic composition.

The above described and other features are exemplified by the following detailed description.

DETAILED DESCRIPTION

The present disclosure can be understood more readily by reference to the following detailed description, examples, drawings, and claims, and their previous and following description. However, before the present compositions, articles, devices, systems, and/or methods are disclosed and described, it is to be understood that this disclosure is not limited to the specific compositions, articles, devices, systems, and/or methods disclosed unless otherwise specified, as such can, of course, vary. It is also to be understood that the terminology used herein is for the purpose of describing particular aspects only and is not intended to be limiting.

The following description of the disclosure is also provided as an enabling teaching of the disclosure in its best, currently known aspect. To this end, those of ordinary skill in the relevant art will recognize and appreciate that changes and modifications can be made to the various aspects of the disclosure described herein, while still obtaining the beneficial results of the present disclosure. It will also be apparent that some of the benefits of the present disclosure can be obtained by selecting some of the features of the present disclosure without utilizing other features. Accordingly, those of ordinary skill in the relevant art will recognize that many modifications and adaptations to the present disclosure are possible and can even be desirable in certain circumstances and are thus also a part of the present disclosure. Thus, the following description is provided as illustrative of the principles of the present disclosure and not in limitation thereof.

Various combinations of elements of this disclosure are encompassed by this disclosure, e.g. combinations of elements from dependent claims that depend upon the same independent claim.

All publications mentioned herein are incorporated herein by reference to disclose and describe the methods and/or materials in connection with which the publications are cited.

It is also to be understood that the terminology used herein is for the purpose of describing particular aspects only and is not intended to be limiting. As used in the specification and in the claims, the term "comprising" can include the aspects "consisting of" and "consisting essentially of." Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a polycarbonate" includes mixtures of two or more such polycarbonates. Furthermore, for example, reference to a filler includes more than one filler.

Reference throughout the specification to "one embodiment", "another embodiment", "an embodiment", and so forth, as well as to "an aspect", "another aspect", and so forth, means that a particular element (e.g., feature, structure, and/or characteristic) described in connection with the embodiment is included in at least one embodiment described herein, and may or may not be present in other embodiments. In addition, it is to be understood that the described elements can be combined in any suitable manner in the various embodiments.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "optional" or "optionally" mean that the subsequently described event, condition, component, or circumstance can or cannot occur, and that the description includes instances where said event or circumstance occurs and instances where it does not.

As used herein, the term or phrase "effective," "effective amount," or "conditions effective to" refers to such amount or condition that is capable of performing the function or property for which an effective amount is expressed. As will be pointed out below, the exact amount or particular condition required can vary from one aspect to another, depending on recognized variables such as the materials employed and the processing conditions observed. Thus, it is not always possible to specify an exact "effective amount" or "condition effective to." However, it should be understood that an appropriate effective amount will be readily determined by one of ordinary skill in the art using only routine experimentation.

Disclosed are the components to be used to prepare disclosed compositions of the disclosure as well as the compositions themselves to be used within methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed, it is understood that each of these additional steps can be performed with any specific aspect or combination of aspects of the methods of the disclosure.

References in the specification and concluding claims to parts by weight, of a particular element or component in a composition or article, denotes the weight relationship between the element or component and any other elements or components in the composition or article for which a part by weight is expressed. Thus, in a composition containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included. For example, if a particular element or component in a composition or article is said to have 8 weight percent (wt %), it is understood that this percentage is in relation to a total compositional percentage of 100%.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. Unless defined otherwise, technical and scientific terms used herein have the same meaning as is commonly understood by one of skill in the art to which this disclosure belongs.

The term "alkyl group" as used herein is a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, decyl, tetradecyl, hexadecyl, eicosyl, tetracosyl and the like. A "lower alkyl" group is an alkyl group containing one to six carbon atoms.

The term "alkoxy" as used herein is an alkyl group bound through a single, terminal ether linkage; that is, an "alkoxy" group can be defined as —OR where R is alkyl as defined above. A "lower alkoxy" group is an alkoxy group containing one to six carbon atoms.

The term "alkenyl group" as used herein is a hydrocarbon group of 2 to 24 carbon atoms and structural formula containing at least one carbon-carbon double bond. Asymmetric structures such as (AB)C=C(CD) are intended to include both the E and Z isomers. This can be presumed in structural formulae herein wherein an asymmetric alkene is present, or it can be explicitly indicated by the bond.

The term "carbonyl group" as used herein is represented by the formula C=O.

As used herein, the terms "number average molecular weight" or "Mn" can be used interchangeably, and refer to the statistical average molecular weight of all the polymer chains in the sample and is defined by the formula:

$$Mn = \frac{\sum N_i M_i}{\sum N_i},$$

where $M_i$ is the molecular weight of a chain and $N_i$ is the number of chains of that molecular weight. Mn can be determined for polymers, such as polycarbonate polymers or polycarbonate-PMMA copolymers, by methods well known to a person having ordinary skill in the art. It is to be understood that as used herein, Mn is measured gel permeation chromatography and as calibrated with polycarbonate standards. For example, gel permeation chromatography can be carried out using a crosslinked styrene-divinyl benzene column, at a sample concentration of 1 milligram per milliliter with appropriate mobile phase solvents.

As used herein, the terms "weight average molecular weight" or "Mw" can be used interchangeably, and are defined by the formula:

$$Mw = \frac{\sum N_i M_i^2}{\sum N_i M_i},$$

where $M_i$ is the molecular weight of a chain and $N_i$ is the number of chains of that molecular weight. Compared to Mn, Mw takes into account the molecular weight of a given chain in determining contributions to the molecular weight average. Thus, the greater the molecular weight of a given chain, the more the chain contributes to the Mw. It is to be understood that as used herein, Mw is measured gel permeation chromatography. In some cases, Mw is measured gel permeation chromatography and calibrated with polycarbonate standards. Gel permeation chromatography can be carried out using a crosslinked styrene-divinyl benzene column, at a sample concentration of 1 milligram per milliliter with appropriate mobile phase solvents.

As used herein, the terms "polydispersity index" or "PDI" can be used interchangeably, and are defined by the formula:

$$PDI = \frac{Mw}{Mn}.$$

The PDI has a value equal to or greater than 1, but as the polymer chains approach uniform chain length, the PDI approaches unity.

The terms "polycarbonate" or "polycarbonates" as used herein includes, without limitation, copolycarbonates, homopolycarbonates and (co)polyester carbonates.

The terms "residues" and "structural units" used in reference to the constituents of the polymers, are synonymous throughout the specification.

Each of the component materials disclosed herein for use in the manufacture of the disclosed thermoplastic compositions are either commercially available and/or the methods for the production thereof are known to those of skill in the art.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

The present disclosure relates generally to thermoplastic compositions, and, more particularly, to a thermoplastic composition comprising a release agent. To that end, according to the aspects of the disclosure, a thermoplastic composition is disclosed that generally comprises a polycarbonate and a release agent. In a further aspect, the thermoplastic composition comprises a polycarbonate polymer and a triacylglyceride release agent.

In one aspect, the thermoplastic composition comprising:
a. a polycarbonate polymer; and
b. a triacylglyceride release agent in an amount of 0.03 wt % to 0.1 wt %, relative to the total weight of the thermoplastic composition; and
c. a UV stabilizer comprising 2-[2-hydroxy-3,5-di(1,1-dimethylbenzylphenyl)]-2H-benzotriazole; 2,2'-methylenebis(6-(2H-benzotriazol-2-yl)-4-(1,1,3,3-tetramethylbutyl)phenol); or pentaerythritol tetrakis(2-cyano-3,3-diphenylacrylate); or a combination comprising at least one of the foregoing; wherein the UV stabilizer is 0.05 wt % to 0.4 wt % relative to the total weight of the thermoplastic composition.

The composition comprises a first component of a polycarbonate polymer.

As used herein, the term "polycarbonate" includes homopolycarbonates and copolycarbonates have repeating structural carbonate units. In one aspect, a polycarbonate can comprise any polycarbonate material or mixture of materials, for example, as recited in U.S. Pat. No. 7,786,246, which is hereby incorporated in its entirety for the specific purpose of disclosing various polycarbonate compositions and methods.

In one aspect, a polycarbonate, as disclosed herein, can be an aliphatic-diol based polycarbonate. In another aspect, a polycarbonate can comprise a carbonate unit derived from a dihydroxy compound, such as for example a bisphenol that differs from the aliphatic diol.

In various aspects, the polycarbonate can comprise copolymers comprising two or more distinct carbonate units. For example, a polycarbonate copolymer can comprise repeating carbonate units derived from 1,1-bis(4-hydroxyphenyl) methylphenylmethane (BisAP) and a second, chemically distinct dihydroxy monomer such as a bisphenol, e.g. bisphenol A. Alternatively, a polycarbonate copolymer can comprise repeating carbonate units derived from 2-phenyl-3,3-bis(4-hydroxyphenyl)phthalimidine (also known as N-phenyl phenolphthalein bisphenol, 3,3-bis(4-hydroxyphenyl)-2-phenylisoindolin-1-one), or "PPPBP") and a second, chemically distinct dihydroxy monomer such as a bisphenol, e.g. bisphenol A (BPA). In another aspect, the polycarbonate polymer comprises a polycarbonate copolymer formed from monomers comprising BPA and comprising dimethylbisphenol cyclohexanone (DMBPC), at least one isosorbide, or at least one aliphatic diol. In a further aspect, the polycarbonate copolymer comprises at least one acid monomer comprising sebacic acid, terephthalic acid, or isophthalic acid. In an even further aspect, the polycarbonate polymer comprises a polycarbonate copolymer formed from monomers comprising BPA and acids comprising sebacic acid, terephthalic acid, or isophthalic acid.

In one aspect, the polycarbonate is derived from a bisphenol A monomer. In another aspect, the polycarbonate is derived from a blend of at least two monomers with at least one of the monomers being bisphenol A.

The polycarbonate-based resin is selected from a polycarbonate or a resin blend that includes a polycarbonate. Accordingly, in one aspect, polycarbonate is used as the base resin in the composition. Polycarbonates including aromatic carbonate chain units include compositions having structural units of the formula (I):

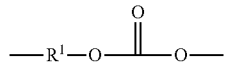
(I)

in which the $R^1$ groups are aromatic, aliphatic or alicyclic radicals. $R^1$ can be an aromatic organic radical and, in an alternative aspect, a radical of the formula (II):

$$-A^1-Y^1-A^2- \quad (II)$$

wherein each of $A^1$ and $A^2$ is a monocyclic divalent aryl radical and $Y^1$ is a bridging radical having zero, one, or two atoms which separate $A^1$ from $A^2$. In an exemplary aspect, one atom separates $A^1$ from $A^2$. Illustrative examples of radicals of this type are —O—, —S—, —S(O)—, —S(O$_2$)—, —C(O)—, methylene, cyclohexyl-methylene, 2-[2,2,1]-bicycloheptylidene, ethylidene, isopropylidene, neopentylidene, cyclohexylidene, cyclopentadecylidene, cyclododecylidene, adamantylidene, or the like. In another aspect, zero atoms separate $A^1$ from $A^2$, with an illustrative example being bisphenol. The bridging radical $Y^1$ can be a hydrocarbon group or a saturated hydrocarbon group such as methylene, cyclohexylidene or isopropylidene.

Polycarbonates can be produced by the Schotten-Bauman interfacial reaction of the carbonate precursor with dihydroxy compounds. Typically, an aqueous base such as sodium hydroxide, potassium hydroxide, calcium hydroxide, or the like, is mixed with an organic, water immiscible solvent such as benzene, toluene, carbon disulfide, or dichloromethane, which contains the dihydroxy compound. A phase transfer agent can be used to facilitate the reaction. Molecular weight regulators can be added either singly or in admixture to the reactant mixture. Branching agents, described forthwith can also be added singly or in admixture.

Polycarbonates can be produced by the interfacial reaction polymer precursors such as dihydroxy compounds in which only one atom separates $A^1$ and $A^2$. As used herein, the term "dihydroxy compound" includes, for example, bisphenol compounds having general formula (III) as follows:

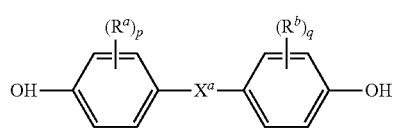
(III)

wherein $R^a$ and $R^b$ each independently represent hydrogen, a halogen atom, or a monovalent hydrocarbon group; p and q are each independently integers 0 to 4; and $X^a$ represents one of the groups of formula (IV):

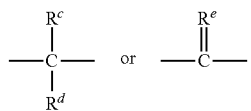
(IV)

wherein $R^c$ and $R^d$ each independently represent a hydrogen atom or a monovalent linear or cyclic hydrocarbon group, and $R^e$ is a divalent hydrocarbon group.

Examples of the types of bisphenol compounds that can be represented by formula (IV) include the bis(hydroxyaryl) alkane series such as, 1,1-bis(4-hydroxyphenyl)methane, 1,1-bis(4-hydroxyphenyl)ethane, 2,2-bis(4-hydroxyphenyl) propane (or bisphenol-A), 2,2-bis(4-hydroxyphenyl)butane, 2,2-bis(4-hydroxyphenyl)octane, 1,1-bis(4-hydroxyphenyl) propane, 1,1-bis(4-hydroxyphenyl)n-butane, bis(4-hydroxyphenyl)phenylmethane, 2,2-bis(4-hydroxy-1-methylphenyl) propane, 1,1-bis(4-hydroxy-t-butylphenyl)propane, 2,2-bis (4-hydroxy-3-bromophenyl)propane, or the like; bis (hydroxyaryl)cycloalkane series such as, 1,1-bis(4-hydroxyphenyl)cyclopentane, 1,1-bis(4-hydroxyphenyl) cyclohexane, or the like, or combinations including at least one of the foregoing bisphenol compounds.

Other bisphenol compounds that can be represented by formula (III) include those where X is —O—, —S—, —SO— or —SO$_2$—. Some examples of such bisphenol compounds are bis(hydroxyaryl)ethers such as 4,4'-dihydroxy diphenylether, 4,4'-dihydroxy-3,3'-dimethylphenyl ether, or the like; bis(hydroxy diaryl)sulfides, such as 4,4'-dihydroxy diphenyl sulfide, 4,4'-dihydroxy-3,3'-dimethyl diphenyl sulfide, or the like; bis(hydroxy diaryl) sulfoxides, such as, 4,4'-dihydroxy diphenyl sulfoxides, 4,4'-dihydroxy-3,3'-dimethyl diphenyl sulfoxides, or the like; bis(hydroxy diaryl)sulfones, such as 4,4'-dihydroxy diphenyl sulfone, 4,4'-dihydroxy-3,3'-dimethyl diphenyl sulfone, or the like; or combinations including at least one of the foregoing bisphenol compounds.

Other bisphenol compounds that can be utilized in the polycondensation of polycarbonate are represented by the formula (V)

(V)

wherein, $R^f$, is a halogen atom of a hydrocarbon group having 1 to 10 carbon atoms or a halogen substituted hydrocarbon group; n is a value 0 to 4. When n is at least 2, $R^f$ can be the same or different. Examples of bisphenol compounds that can be represented by the formula (IV), are resorcinol, substituted resorcinol compounds such as 3-methyl resorcin, 3-ethyl resorcin, 3-propyl resorcin, 3-butyl resorcin, 3-t-butyl resorcin, 3-phenyl resorcin, 3-cumyl resorcin, 2,3,4,6-tetrafloro resorcin, 2,3,4,6-tetrabromo resorcin, or the like; catechol, hydroquinone, substituted hydroquinones, such as 3-methyl hydroquinone, 3-ethyl hydroquinone, 3-propyl hydroquinone, 3-butyl hydroquinone, 3-t-butyl hydroquinone, 3-phenyl hydroquinone, 3-cumyl hydroquinone, 2,3,5,6-tetramethyl hydroquinone, 2,3,5,6-tetra-t-butyl hydroquinone, 2,3,5,6-tetrafloro hydroquinone, 2,3,5,6-tetrabromo hydroquinone, or the like; or combinations including at least one of the foregoing bisphenol compounds.

Bisphenol compounds such as 2,2,2',2'-tetrahydro-3,3,3', 3'-tetramethyl-1,1'-spirobi-[1H-indene]-6,6'-diol represented by the following formula (VI) can also be used.

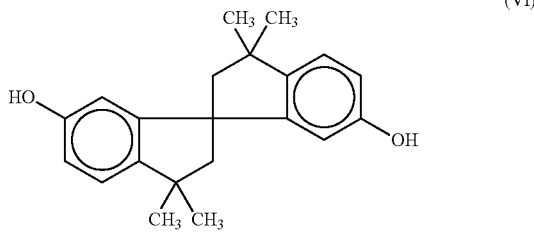

(VI)

In one aspect, the bisphenol compound is bisphenol A.

Typical carbonate precursors include the carbonyl halides, for example carbonyl chloride (phosgene), and carbonyl bromide; the bis-haloformates, for example, the bis-haloformates of dihydric phenols such as bisphenol A, hydroquinone, or the like, and the bis-haloformates of glycols such as ethylene glycol and neopentyl glycol; and the diaryl carbonates, such as diphenyl carbonate, di(tolyl) carbonate, and di(naphthyl) carbonate. In one aspect, the carbonate precursor for the interfacial reaction is carbonyl chloride.

It is also possible to employ polycarbonates resulting from the polymerization of two or more different dihydric phenols or a copolymer of a dihydric phenol with a glycol or with a hydroxy- or acid-terminated polyester or with a dibasic acid or with a hydroxy acid or with an aliphatic diacid in the event a carbonate copolymer rather than a homopolymer is selected for use. The aliphatic diacids can have 2 to 40 carbons, for example, dodecanedioic acid.

Branched polycarbonates, as well as blends of linear polycarbonate and a branched polycarbonate can also be used in the composition. The branched polycarbonates can be prepared by adding a branching agent during polymerization or when the polycarbonate is prepared by the melt process formed in situ by side reactions. These branching agents can include polyfunctional organic compounds containing at least three functional groups, which can be hydroxyl, carboxyl, carboxylic anhydride, haloformyl, and combinations including at least one of the foregoing branching agents. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) α,α-dimethyl benzyl)phenol), 4-chloroformyl phthalic anhydride, trimesic acid, benzophenone tetracarboxylic acid, or the like, or combinations including at least one of the foregoing branching agents. The branching agents can be added at a level of 0.05 to 2.0 wt %, based upon the total weight of the polycarbonate in a given layer.

In one aspect, the polycarbonate can be produced by a melt polycondensation reaction between a dihydroxy compound and a carbonic acid diester. Examples of the carbonic acid diesters that can be utilized to produce the polycarbonates are diphenyl carbonate, bis(2,4-dichlorophenyl)carbonate, bis(2,4,6-trichlorophenyl) carbonate, bis(2-cyanophenyl) carbonate, bis(o-nitrophenyl) carbonate, ditolyl carbonate, m-cresyl carbonate, dinaphthyl carbonate, bis (diphenyl) carbonate, bis (methylsalicyl)carbonate, diethyl carbonate, dimethyl carbonate, dibutyl carbonate, dicyclohexyl carbonate, or the like, or combinations including at least one of the foregoing carbonic acid diesters. In one aspect, the carbonic acid diester is diphenyl carbonate or bis (methylsalicyl)carbonate.

The polycarbonate can be made by a melt polymerization process. The term "melt polymerization conditions" is understood to mean those conditions necessary to affect reaction between a dihydroxy compound (e.g., an aromatic dihydroxy compound) and a carbonate compound in the presence of a transesterification catalyst. Although solvents are generally not used in the process, and the reactants dihydroxy compound and the carbonate compound are in a molten state, the dihydroxy compound and/or the carbonate compound can be added to the polymerization unit as a solvent mixture, such as a mixture with acetone. The reaction temperature can be 100° C. to 350° C., or 150° C. to 325° C., or 180° C. to 310° C. The pressure can be at atmospheric pressure, supra-atmospheric pressure, or a range of pressures from atmospheric pressure to 15 torr in the initial stages of the reaction, and at a reduced pressure at later stages, for example, 0.2 to 15 torr. The reaction time is generally 0.1 hours to 10 hours.

The melt polymerization process can be a batch or a continuous melt process. In either case, the melt polymerization conditions used can comprise two or more distinct reaction stages, for example, a first reaction stage in which the starting aromatic dihydroxy compound and diaryl carbonate are converted into an oligomeric polycarbonate and a second reaction stage wherein the oligomeric polycarbonate formed in the first reaction stage is converted to high molecular weight polycarbonate. Such "staged" polymerization reaction conditions are especially suitable for use in continuous polymerization systems wherein the starting monomers are oligomerized in a first reaction vessel and the oligomeric polycarbonate formed therein is continuously transferred to one or more downstream reactors in which the oligomeric polycarbonate is converted to high molecular weight polycarbonate. Typically, in the oligomerization stage the oligomeric polycarbonate produced has a number average molecular weight (Mn) of 1,000 to 7,500 g/mol. In one or more subsequent polymerization stages, the number average molecular weight of the polycarbonate can be increased to 8,000 to 25,000 g/mol (using polycarbonate standard).

A transesterification catalyst(s) can be employed in the melt polymerization. Such catalysts include phase transfer catalysts of formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing. The catalyst can comprise a potassium sodium phosphate of the formula $NaKHPO_4$.

Catalysts used in the melt transesterification polymerization production of polycarbonates can include alpha and/or beta catalysts. Beta catalysts are typically volatile and degrade at elevated temperatures and can therefore be used at early low-temperature polymerization stages.

Possible beta catalyst(s) can comprise a quaternary ammonium compound, a quaternary phosphonium compound, or a combination comprising at least one of the foregoing. The quaternary ammonium compound can be a compound of the structure $(R^4)_4N^+X^-$, wherein each $R^4$ is the same or different, and is a $C_{1-20}$ alkyl, a $C_{4-20}$ cycloalkyl, or a $C_{4-20}$ aryl; and $X^-$ is an organic or inorganic anion, for example, a hydroxide, halide, acetate, phenoxide, carboxylate, sulfonate, sulfate, formate, carbonate, or bicarbonate. Examples of organic quaternary ammonium compounds include tetramethyl ammonium hydroxide, tetrabutyl ammonium hydroxide, tetramethyl ammonium acetate, tetramethyl ammonium formate, tetrabutyl ammonium acetate, and combinations comprising at least one of the foregoing. Tetramethyl ammonium hydroxide is often used.

The quaternary phosphonium compound can be a compound of the structure $(R^5)_4P^+X^-$, wherein each $R^5$ is the same or different, and is a $C_{1-20}$ alkyl, a $C_{4-20}$ cycloalkyl, or a $C_{4-20}$ aryl; and $X^-$ is an organic or inorganic anion, for example a hydroxide, halide, carboxylate, sulfonate, sulfate, formate, carbonate, or bicarbonate. Where $X^-$ is a polyvalent anion such as carbonate or sulfate it is understood that the positive and negative charges in the quaternary ammonium and phosphonium structures are properly balanced. For example, where $R^{20}$ to $R^{23}$ are each methyls and $X^-$ is carbonate. It is understood that $X^-$ represents 2 ($CO_3^{-2}$). Examples of organic quaternary phosphonium compounds include tetramethyl phosphonium hydroxide, tetramethyl phosphonium acetate, tetramethyl phosphonium formate, tetrabutyl phosphonium hydroxide, tetrabutyl phosphonium acetate (TBPA), tetraphenyl phosphonium acetate, tetraphenyl phosphonium phenoxide, and combinations comprising at least one of the foregoing. TBPA is often used.

The amount of beta catalyst employed is typically based upon the total number of moles of dihydroxy compound employed in the polymerization reaction. When referring to the ratio of beta catalyst, for example, phosphonium salt, to all dihydroxy compounds employed in the polymerization reaction, it is convenient to refer to moles of phosphonium salt per mole of the dihydroxy compound(s), meaning the number of moles of phosphonium salt divided by the sum of the moles of each individual dihydroxy compound present in the reaction mixture. The amount of beta catalyst (e.g., organic ammonium or phosphonium salts) employed can be $1\times10^{-2}$ to $1\times10^{-5}$, for example, $1\times10^{-2}$ to $1\times10^{-4}$, or $1\times10^{-3}$ to $1\times10^{-4}$ moles per total mole of the dihydroxy compounds in the reaction mixture.

Alpha catalysts are typically more thermally stable and less volatile than beta catalysts. Nearly all of the alpha catalyst (e.g., greater than 80 wt %, specifically greater than 90%) survives the polymerization process. As such, this catalyst is available to catalyze additional (and generally unwanted) reactions downstream of the polymerization process, such as in the extruder.

The alpha catalyst can comprise a source of alkali or alkaline earth ions. The sources of these ions include alkaline earth hydroxides such as magnesium hydroxide and calcium hydroxide. Sources of alkali metal ions can include the alkali metal hydroxides such as illustrated by lithium hydroxide, sodium hydroxide, potassium hydroxide, and combinations comprising at least one of the foregoing. Examples of alkaline earth metal hydroxides are calcium hydroxide, magnesium hydroxide, and combinations comprising at least one of the foregoing. Of these, sodium hydroxide is particularly desirable. Other possible sources of alkaline earth and alkali metal ions include salts of carboxylic acids (such as sodium acetate) and derivatives of ethylene diamine tetraacetic acid (EDTA) (such as EDTA tetrasodium salt, and EDTA magnesium disodium salt), as well as combinations comprising at least one of the foregoing. For example, the alpha catalyst can comprise alkali metal salt(s) of a carboxylic acid, alkaline earth metal salt(s) of a carboxylic acid, or a combination comprising at least one of the foregoing. In another example, the alpha catalyst comprises $Na_2Mg$ EDTA or a salt thereof.

The alpha catalyst typically can be used in an amount sufficient to provide $1\times10^{-2}$ to $1\times10^{-8}$ moles, for example, $1\times10^{-3}$ to $1\times10^{-8}$ moles, specifically, $1\times10^{-4}$ to $1\times10^{-7}$ moles of metal hydroxide per mole of the dihydroxy compounds employed.

The alpha transesterification catalyst can also, or alternatively, comprise salt(s) of a non-volatile inorganic acid. For example, the alpha catalyst can comprise salt(s) of a non-volatile inorganic acid such as $NaH_2PO_3$, $NaH_2PO_4$, $Na_2HPO_3$, $NaHCO_3$, $Na_2CO_3$, $KH_2PO_4$, $CsH_2PO_4$, $Cs_2HPO_4$, $Cs_2CO_3$, and combinations comprising at least one of the foregoing. Alternatively, or in addition, the alpha transesterification catalyst can comprise mixed alkali metal salt(s) of phosphoric acid, such as $NaKHPO_4$, $CsNaHPO_4$, $CsKHPO_4$, and combinations comprising at least one of the foregoing.

A quencher can be added, for example to a finishing extruder to reduce the activity of the catalyst. Quenching agents include boric acid esters (e.g., $B(OCH_3)_3$, $B(OCH_2CH_3)_3$, and $B(OC_6H_6)_3$, zinc borate, boron phosphate, aluminum stearate, aluminum silicate, zirconium carbonate, zirconium $C_1$-$C_{12}$ alkoxides, zirconium hydroxycarboxylates, gallium phosphide, gallium antimonide, germanium oxide, $C_1$-$C_{32}$ organogermanium compounds, $C_4$-$C_{32}$ tetraorganotin tin compound, $C_6$-$C_{32}$ hexaorganotin compound (e.g., $[(C_6H_6O)Sn(CH_2CH_2CH_2CH_3)_2]_2O)$, $Sb_2O_3$, antimony oxide, $C_1$-$C_{32}$ alkylantimony, bismuth oxide, $C_1$-$C_{12}$ alkylbismuth, zinc acetate, zinc stearate, $C_1$-$C_{32}$ alkoxytitanium, and titanium oxide, phosphoric acid, phosphorous acid, hypophosphorous acid, pyrophosphoric acid, polyphosphoric acid, boric acid, hydrochloric acid, hydrobromic acid, sulfuric acid, sulfurous acid, adipic acid, azelaic acid, dodecanoic acid, L-ascorbic acid, aspartic acid, benzoic acid, formic acid, acetic acid, citric acid, glutamic acid, salicylic acid, nicotinic acid, fumaric acid, maleic acid, oxalic acid, benzenesulfinic acid, $C_1$-$C_{12}$ dialkyl sulfates (e.g., dimethyl sulfate and dibutyl sulfate), alkyl sulfonic esters of the formula $R_1SO_3R_2$ wherein $R_1$ is hydrogen, $C_1$-$C_{12}$ alkyl, $C_6$-$C_{18}$ aryl, or $C_7$-$C_{19}$ alkylaryl, and $R_2$ is $C_1$-$C_{12}$ alkyl, $C_6$-$C_{18}$ aryl, or $C_7$-$C_{19}$ alkylaryl (e.g., benzenesulfonate, p-toluenesulfonate, methylbenzene sulfonate, ethylbenzene sulfonate, n-butyl benzenesulfonate, octyl benzenesulfonate and phenyl benzenesulfonate, methyl p-toluenesulfonate, ethyl p-toluenesulfonate, n-butyl p-toluene sulfonate, octyl p-toluenesulfonate and phenyl p-toluenesulfonate, in particular alkyl tosylates such as n-butyl tosylate), sulfonic acid phosphonium salts of the formula $(R^aSO_3^-)(PR^b_4)^+$ wherein $R^a$ is hydrogen, $C_1$-$C_{12}$ alkyl, $C_6$-$C_{18}$ aryl, or $C_7$-$C_{19}$ alkylaryl, and each $R^b$ is independently hydrogen, $C_1$-$C_{12}$ alkyl or $C_6$-$C_{18}$ aryl, sulfonic acid derivatives of the formula $A^1$-$(Y^1$—$SO_3X^1)_m$ wherein $A^1$ is a $C_1$-$C_{40}$ hydrocarbon group having a valence of m, $Y^1$ is a single bond or an oxygen atom, $X^1$ is a secondary or tertiary alkyl group of the formula —$CR^{15}R^{16}R^{17}$, a metal cation of one equivalent, an ammonium cation (e.g., $NR^b_3{}^+$ wherein each $R^b$ is independently hydrogen, $C_1$-$C_{12}$ alkyl or $C_6$-$C_{18}$ aryl), or a phosphonium (e.g., $PR^b_4{}^+$ wherein each $R^b$ is independently hydrogen, $C_1$-$C_{12}$ alkyl or $C_6$-$C_{18}$ aryl) wherein $R^{15}$ is a hydrogen atom or an alkyl group having 1 to 5 carbon atoms, $R^{16}$ is a hydrogen atom, a phenyl group or an alkyl group having 1 to 5 carbon atoms, and $R^{17}$ is the same as or different from $R^{15}$ and has the same definition as $R^{15}$, provided that two of $R^{13}$, $R^{16}$, and $R^{17}$ cannot be hydrogen atoms, and m is an integer of 1 to 4, provided that when $Y^1$ is a single bond, all of $X^1$ in an amount of m cannot be metal cations of one equivalent, a compound of the formula $^+X^2$-$A^2$-$Y^1$—$SO_3^-$ wherein $A^2$ is a divalent hydrocarbon group, $^+X^2$ is a secondary, tertiary or quaternary ammonium cation or a secondary (e.g., tertiary or quaternary phosphonium cation, and $Y^1$ is a single bond or an oxygen atom, a compound of the formula $A^3$-$(^+X^3)_n$—$(R—Y^1—SO_3^-)_n$ wherein $A^3$ is a $C_1$-$C_{40}$ hydrocarbon group having a valence of n, $^+X^3$ is a secondary, tertiary or quaternary ammonium cation (e.g., $NR^b_3{}^+$ wherein each $R^b$ is independently hydrogen, $C_1$-$C_{12}$ alkyl or $C_6$-$C_{18}$ aryl), or a secondary, tertiary or quaternary phosphonium cation (e.g., $PR^b_4{}^+$ wherein each $R^b$ is independently hydrogen, $C_1$-$C_{12}$ alkyl or $C_6$-$C_{18}$ aryl), R is a monovalent $C_1$-$C_{40}$ hydrocarbon group, n is an integer of 2 to 4, and $Y^1$ is a single bond or an oxygen atom, a compound of the formula $A^5$-$Ad^1$-$A^4$-$(Ad^2$-$A^5)_l$, wherein $A^5$ is a novalent or divalent $C_1$-$C_{40}$ hydrocarbon group, $A^4$ is a divalent $C_1$-$C_{40}$ hydrocarbon group, each of $Ad^1$ and $Ad^e$ is independently an acid anhydride group selected from —$SO_2$—O—$SO_2$—, —$SO_2$—O—CO— and —CO—O—$SO_2$—, and l is 0 or 1, provided that when l is 0, —$(Ad^2$-$A^5)_l$ is a hydrogen atom or a bond between $A^4$ and $A^5$, in which $A^5$ is a divalent hydrocarbon group or a single bond, aminosulfonic esters having the formula $R_aR_bN$-$A$-$SO_3R_c$, wherein $R_a$ and $R_b$ are each independently hydrogen, $C_1$-$C_{12}$ alkyl, $C_6$-$C_{22}$ aryl, $C_7$-$C_{19}$ alkylaryl or $R_a$ and $R_b$, either singly or in combination, form an aromatic or non-aromatic heterocyclic compound with N (e.g., pyrrolyl, pyridinyl, pyrimidyl, pyrazinyl, carbazolyl, quinolinyl, imidazoyl, piperazinyl, oxazolyl, thiazolyl, pyrazolyl, pyrrolinyl, indolyl, purinyl, pyrrolydinyl, or the like), $R_c$ is hydrogen, and A is $C_1$-$C_{12}$ alkyl, $C_6$-$C_{18}$ aryl, or $C_{17}$-$C_{19}$ alkylaryl (e.g., compounds such as N-(2-hydroxyethyl) piperazine-N'-3-propanesulfonic acid, 1,4,-piperazinebis (ethanesulfonic acid), and 5-dimethylamino-1-napthalenesulfonic acid), ammonium sulfonic esters of the formula $R_aR_bR_cN^+$-$A$-$SO_3^-$, wherein $R_a$, $R_b$, are each independently hydrogen, $C_1$-$C_{12}$ alkyl, $C_1$-$C_{12}$ aryl, $C_7$-$C_{19}$ alkylaryl, or $R_a$ and $R_b$, either singly or in combination, form an aromatic or non-aromatic heterocyclic compound with N (e.g., pyrrolyl, pyridinyl, pyrimidyl, pyrazinyl, carbazolyl, quinolinyl, imidazoyl, piperazinyl, oxazolyl, thiazolyl, pyrazolyl, pyrrolinyl, indolyl, purinyl, pyrrolydinyl, or the like), $R_c$ is a hydrogen, and A is $C_1$-$C_{12}$ alkyl, $C_6$-$C_{18}$ aryl, or $C_7$-$C_{19}$ alkylaryl, suffonated polystyrene, methyl acrylate-sulfonated styrene copolymer, and combinations comprising at least one of the foregoing. Quenching agents can include a combination of compounds, for example, an alkyl tosylate such as n-butyl tosylate and phosphorus acid.

In general, melt polymerization of polycarbonate utilizes a polymerization unit that can comprise a mixer(s), a buffer vessel(s), an oligomerization vessel(s), a polymerization vessel(s), an extruder(s), a scrubber(s), a filter(s), or combinations comprising one or more of the foregoing. The melt polymerization unit can comprise a polymerization vessel, a melt filter, and an extruder, wherein the melt filter can be located upstream from the extruder. The melt polymerization unit can comprise a first and a second parallel line, wherein the first parallel line is connected to the melt filter located upstream from the extruder, and wherein the second parallel line is connected to a second melt filter that is located upstream from a second extruder.

The polymerization can occur in a polymerization vessel or in a series of polymerization vessels that can have increasing temperature and vacuum. The initial polymerization vessels can be oligomerization units. After a final polymerization vessel (also referred to as a final polymerization unit), the polymer can be extruded and subjected to filtration in a melt filter.

One or more additives (for example, one or both of a release agent such as GTS and an ultraviolet absorber) can be added to the melt filtered polycarbonate and extruded.

In one aspect, the polycarbonate is a melt polycarbonate. In another aspect, the polycarbonate is an interfacial polycarbonate. In a further aspect, a melt polycarbonate means a polycarbonate made by a melt polymerization process. In an even further aspect, an interfacial polycarbonate means a polycarbonate made by an interfacial polymerization process.

In one aspect, the polycarbonate can comprise different grades of polycarbonates. The polycarbonate can have different additional functional groups which can or cannot be incorporated into the polymer. For example, the polycarbonate can be selected from PC 105 and/or PC 175, both commercially available from SABIC's Innovative Plastics business. Non-limiting examples of additional functional groups can include aromatic groups, phenyl groups, for example, bisphenol A (BPA), alkyl groups, halogen groups, or amide groups.

The polycarbonate can be a high viscosity polycarbonate, for example, the high viscosity polycarbonate can have a Melt Volume Rate (MVR) of less than or equal to 10 grams per 10 minutes (g/10 min), specifically, less than or equal to 6 g/10 min measured at 300 degrees Celsius (° C.)/1.2 kilogram (kg) according to ASTM D1238-04 or ISO 1133. The polycarbonate can be a low viscosity polycarbonate, for example, the low viscosity polycarbonate can have a Melt Volume Rate (MVR) of greater than or equal to 10 grams per 10 minutes (g/10 min), specifically, greater than or equal to 15 g/10 min, more specifically, greater than or equal to 20 g/10 min, measured at 300 degrees Celsius (° C.)/1.2 kilogram (kg) according to ASTM D1238-04 or ISO 1133.

The polycarbonate can, for example, be made by a melt process with an MVR of 2 g/10 min to 250 g/10 min at 300 degrees Celsius (° C.)/1.2 kilograms (kg) according to ASTM D1238-04 or ISO 1133. In one aspect, the MVR is 2 g/10 min to 10 g/10 min at 300° C./1.2 kg according to ASTM D1238-04 or ISO 1133. In another aspect, the melt flow rate (MFR) is 2 g/10 min to 250 g/10 min at 300° C./1.2 kg according to ASTM D1238-04 or ISO 1133. In a further aspect, the MFR is 2 g/10 min to 10 g/10 min at 300° C./1.2 kg according to ASTM D1238-04 or ISO 1133. In a further aspect, the MFR is 10 g/10 min to 300 g/10 min at 300° C./1.2 kg according to ASTM D1238-04 or ISO 1133. In a further aspect, the MFR is 5.5 g/10 min to 7.5 g/10 min at 300° C./1.2 kg according to ASTM D1238-04 or ISO 1133.

The polycarbonate can, for example, be made by a melt process and can have an endcap level [ratio of phenol endgroups to total endgroup amount in % (OH+Phenol)] higher than 50%, specifically, greater than 80%, more specifically, 80 to less than 100%, for example, 85 to 95% or 80 to 95%. The polycarbonate can, for example, be made by a melt process and can have an endcap level of 65 to 71%.

The polycarbonate can, for example, be made by a melt process and can have an endcap level of greater than or equal to 60 mol %, more specifically, greater than or equal to 80 mol %, more specifically, greater than or equal to 90 mol % wherein the endcapping is the molar ratio in percent of phenolic end groups based on the total moles of end groups. Specifically, the endcap level in percent (% EC) is determined by the following equation:

$$\% \, EC = 100 - \left( \frac{\text{ppmOH} + Mn}{340{,}000} \right)$$

wherein ppm OH is the amount of hydroxyl end groups in ppm and Mn is the number averaged molecular weight based on polycarbonate standards in Daltons. The ppm OH can be determined by Fourier Transform Infrared Spectroscopy (FTIR), for example, on a Perkin Elmer FTIR Spectrum One Device by dissolving 0.5 grams (g) of the polycarbonate sample in 25 milliliters (mL) of dried chloroform, measuring the absorbance at a wavelength of 3,584 inverse centimeters ($cm^{-1}$) using a univariable calibration, and normalizing the absorbance by dividing the absorbance by the absorbance at 2,779 $cm^{-1}$. The polycarbonate can have an endcap level of 65 to 71%.

In one aspect, the polydispersity index (PDI) of the polycarbonate is 1.9 to 2.6.

In one aspect, the polycarbonate has branching from the structures below of less than 6,000 parts per million by weight (ppm), specifically, less than 2,000 ppm, more specifically, 1,000 to 1,200 ppm.

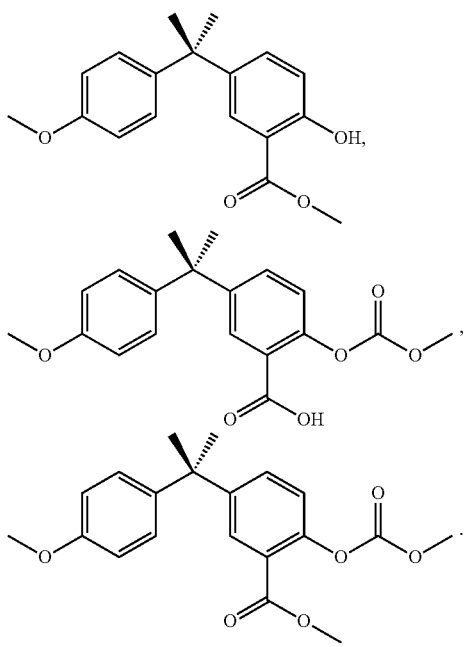

The polycarbonate can comprise a melt polycarbonate with a Fries level of less than 500 parts per million by weight (ppm), specifically, less than or equal to 400 ppm.

In another aspect, the polycarbonate has branching, including the structures disclosed in U.S. Pat. No. 7,084,233, which is herein incorporated by this reference for its teaching of branching.

In one aspect, the number average molecular weight of the polycarbonate polymer is measured using a standard. In another aspect, the standard is polystyrene. As such, when reference is made to "polystyrene basis," this reference indicates the standard which is used.

In one aspect, the polycarbonate polymer comprises a polycarbonate polymer with a number average molecular weight (Mn) of 15,000 to 150,000, specifically, 20,000 to 60,000, more specifically, 20,000 to 30,000, for example, 24,000 to 26,000 g/mol (polystyrene basis). In a further aspect, the polycarbonate polymer comprises a polycarbonate polymer with a number average molecular weight of 27,000 to 80,000 g/mol (polystyrene basis). In one aspect, the polycarbonate polymer comprises a polycarbonate polymer with a number average molecular weight (Mn) of 10,000 to 20,000, specifically, 12,000 to 15,000, for example, 12,000 to 13,000 g/mol (polycarbonate basis).

The polycarbonate polymer can have a weight average molecular weight of 13,000 to 15,000 g/mol (polycarbonate basis). The polycarbonate polymer can have a weight average molecular weight of 10,000 to 40,000 g/mol, specifically, 25,000 to 35,000, for example, 28,000 to 30,000 g/mol (polycarbonate basis). The polycarbonate polymer can have a weight average molecular weight of 40,000 to 80,000 g/mol, specifically, 50,000 to 70,000, for example, 56,000 to 60,000 (polystyrene basis).

In an even further aspect, the polycarbonate polymer comprises a BPA polycarbonate with a number average molecular weight of 27,000 to 80,000 g/mol (polystyrene basis). In another aspect, the polycarbonate copolymer can comprise BPA in combination with, for example, dimethylbisphenol cyclohexanone (DMBPC), Isosorbide, aliphatic diols or acids, for example, sebacic acid with a number average molecular weight of 27,000 to 80,000 g/mol (polystyrene basis).

In one aspect, the polycarbonate comprises at least 5 wt % relative to the thermoplastic composition's total weight percentage. In a further aspect, the composition comprises greater than or equal to 90 wt %, specifically, greater than or equal to 91 wt %, more specifically, greater than or equal to 95 wt %, still more specifically, greater than or equal to 99.5 wt % polycarbonate relative to the thermoplastic composition's total weight percentage. In a further aspect, the polycarbonate comprises at least 99 wt % relative to the thermoplastic composition's total weight percentage. In another aspect, the total polycarbonate amount is 5 wt % to 99.7 wt %, relative to the thermoplastic composition's total weight percentage. In a further aspect, the total polycarbonate amount is 1 wt % to 99.7 wt % relative to the thermoplastic composition's total weight percentage. In an even further aspect, the total polycarbonate amount is 1 wt % to 99.92 wt % relative to the thermoplastic composition's total weight percentage. In a yet further aspect, the total polycarbonate amount is 1 wt % to 99.5 wt % relative to the thermoplastic composition's total weight percentage. In another aspect, the total polycarbonate amount is 1 wt % to 99.91 wt % relative to the thermoplastic composition's total weight percentage. In a further aspect, the total polycarbonate amount is 1 wt % to 99.47 wt % relative to the thermoplastic composition's total weight percentage.

The disclosed compositions also comprise a second component. The second component is a triacylglyceride release agent.

In one aspect, the composition comprises a release agent of formula (I)

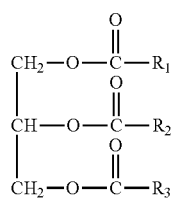

(I)

wherein $R_1$, $R_2$, and $R_3$ can be the same or different hydrocarbon chains with 8 to 20 carbon atoms and 0 to 6 unsaturations.

In one aspect, $R_1$, $R_2$, and $R_3$ are independently selected from $C_8$-$C_{20}$ alkyl, $C_8$-$C_{20}$ haloalkyl, $C_8$-$C_{20}$ polyhaloalkyl, $C_8$-$C_{20}$ alkene, and $C_8$-$C_{20}$ alkoxy. In another aspect, $R_1$, $R_2$, and $R_3$ are independently selected from $C_{17}H_{35}$ and in another aspect are all $C_{17}H_{35}$.

In one aspect, the triacylglyceride release agent comprises glycerol tristearate (GTS). GTS is a solid at room temperature with a melting point of 72 to 75° C., which facilitates handling of the release agent. This fully esterified glycerol molecule does not contain free hydroxyl groups as glycerol monostearate (GMS), hence no degradation of the thermoplastic composition is promoted. A smaller molecule than PETS, GTS retains sufficient mobility to partially migrate to the surface of the molten providing better release than PETS, yet has a lower plate-out than GMS.

In one aspect, the triacylglyceride release agent is the only release agent in the thermoplastic composition. In another aspect, the glycerol tristearate is the only release agent in the thermoplastic composition. In a further aspect, the thermoplastic composition comprises a single release agent in the thermoplastic composition.

In one aspect, the triacylglyceride release agent is present in an amount of 0.01 weight percent to 0.5 weight percent relative to the total weight of the thermoplastic composition. In another aspect, the triacylglyceride release agent is present in an amount of 0.03 weight percent to 0.1 weight percent relative to the total weight of the thermoplastic composition. In a yet further aspect, the triacylglyceride release agent is present in an amount of 0.03 weight percent to 0.05 weight percent relative to the total weight of the thermoplastic composition.

In one aspect, the triacylglyceride release agent is present in an amount of 0.01 to 0.05 weight percent, specifically, 0.01 to less than 0.05 weight percent, more specifically 0.01 to 0.04 weight percent, still more specifically, 0.03 to 0.04 weight percent relative to the total amount of the thermoplastic composition. The triacylglyceride release agent can be present in an amount of 0.03 to 0.05, specifically, 0.03 to less than 0.05 weight percent relative to the total amount of the thermoplastic composition. In another aspect, the glycerol tristearate is present in an amount of 0.01 weight percent to 0.5 weight percent relative to the total weight of the thermoplastic composition. In a further aspect, the glycerol tristearate is present in an amount of 0.05 weight percent to 0.4 weight percent relative to the total weight of the thermoplastic composition. In another aspect, the glycerol tristearate is present in an amount of 0.03 weight percent to 0.1 weight percent relative to the total weight of the thermoplastic composition. In a yet further aspect, the glycerol tristearate is present in an amount of 0.03 weight percent to 0.05 weight percent relative to the total weight of the thermoplastic composition.

The composition can be free a release agent other than the triacylglyceride release agent. Where examples of other release agents include monoacylglycerides such as glycerol monostearate; a poly-alpha olefin such as saturated poly (alpha) oligomer and saturated poly(l-decene) oligomer; linear low density polyethylene (LLDPE); acid esters such as dioctyl-4,5-epoxy-hexahydrophthalate; tris-(octoxycarbonylethyl)isocyanurate; epoxidized soybean oil; silicones, including silicone oils; esters, for example, fatty acid esters such as alkyl stearyl esters, e.g., methyl stearate, stearyl stearate, pentaerythritol tetrastearate, and the like; combinations of methyl stearate and hydrophilic and hydrophobic nonionic surfactants comprising polyethylene glycol polymers, polypropylene glycol polymers, poly(ethylene glycol-co-propylene glycol) copolymers, or a combination comprising at least one of the foregoing glycol polymers, e.g., methyl stearate and polyethylene-polypropylene glycol copolymer in a solvent; waxes such as beeswax, montan wax, and paraffin wax; alkyl amides of the structures (A) and (B) shown below, alkyl amides comprising primary amides, the $C_{1-6}$ N-alkyl amides and the, $C_{1-6}$ secondary amides of; linear or branched $C_{12-36}$ alkyl carboxylic acids, erucic acid, stearic acid, oleic acid, linoleic acid, linolenic acid, myristic acid, palmitic acid, arachidonic acid, behenic acid, lignoceric acid and $C_{6-20}$ bis amides of $C_{2-6}$ alkylene diamines or a combination of at least one of the foregoing alkyl amides;

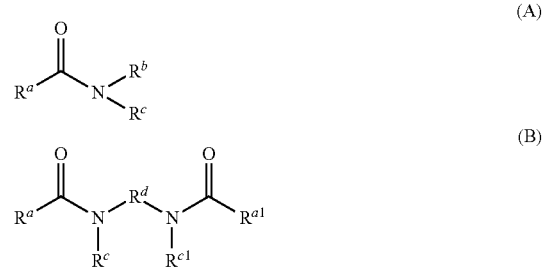

wherein $R^a$ or $R^{a1}$ are a $C_{1-30}$ alkyl group and $R^b$, $R^c$, and $R^{c1}$ are independently H or a $C_{1-30}$ alkyl group and $R^d$ is a $C_{2-6}$ alkyl group; where the composition can comprise less than or equal to 0.01 weight percent, specifically, 0 weight percent of a total amount of release agent that is not the triacylglyceride release agent based on the total weight of the composition.

In one aspect, the thermoplastic composition further comprises an ultraviolet (UV) stabilizer.

In another aspect, the UV stabilizer comprises 2-[2-hydroxy-3,5-di(1,1-dimethylbenzylphenyl)]-2H-benzotriazole; 2,2'-methylenebis(6-(2H-benzotriazol-2-yl)-4-(1,1,3,3-tetramethylbutyl)phenol); or pentaerythritol tetrakis(2-cyano-3,3-diphenylacrylate), or a combination comprising at least one of the foregoing. In a further aspect, the UV stabilizer comprises 2-benzotriazolyl-4-tert-octylphenol.

UV stabilizers include, for example, hydroxybenzophenones; hydroxybenzotriazoles; hydroxybenzotriazines; cyanoacrylates; oxanilides; and benzoxazinones. Examples of UV stabilizers include 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis (2,4-dimethylphenyl)-1,3,5-triazin-2-yl]-5-(octyloxy)-phenol (CYASORB™ 1164); 2,2'-(1,4-phenylene)bis(4H-3, 1-benzoxazin-4-one) (CYASORB™ UV-3638); 1,3-bis[(2-cyano-3,3-diphenylacryloyl)oxy]-2,2-bis[[(2-cyano-3,3-diphenylacryloyl)oxy]methyl]propane (UVINUL™ 3030); 2,2'-(1,4-phenylene) bis(4H-3,1-benzoxazin-4-one); 1,3-bis [(2-cyano-3,3-diphenylacryloyl)oxy]-2,2-bis[[(2-cyano-3,3-diphenylacryloyl)oxy]methyl]propane; 2-(2'-hydroxy-5'-tert-octylphenyl)benzotriazole; 2-(2H-benzotriazol-2-yl)-p-cresol; 1-(Methyl)-8-(1,2,2,6,6-pentamethyl-4-piperidinyl)-sebacate; bis (1,2,2,6,6-pentamethyl-4-piperidinyl)-sebacate; 2-(2-hydroxy-5-methylphenyl)benzotriazole, 2-(2-hydroxy-5-tert-octylphenyl)-benzotriazole; 2-hydroxy-4-n-octoxy benzophenone; nano-size inorganic materials such as titanium oxide, cerium oxide, and zinc oxide, all with particle size less than 100 nanometers; or the like, or combinations including at least one of the foregoing UV stabilizers. The UV stabilizer can comprise one or more UV stabilizers under the tradename TINUVIN™. The UV stabilizer can comprise 2-(2H-benzotriazol-2-yl)-p-cresol.

In one aspect, the UV stabilizer is present in an amount of 0.05 wt % to 10 wt % relative to the total weight of the thermoplastic composition. In another aspect, the UV stabilizer is present in an amount of 0.05 wt % to 0.5 wt % relative to the total weight of the thermoplastic composition. In a further aspect, the UV stabilizer is present in an amount of 0.05 wt % to 0.4 wt % relative to the total weight of the composition. In a further aspect, the UV stabilizer is present in an amount of 0.10 wt % to 0.14 wt % relative to the total weight of the composition.

The disclosed compositions further optionally comprise one or more additives conventionally used in the manufacture of polymer resin with the proviso that the additives do not adversely affect the desired properties of the resulting composition. Mixtures of additives can also be used. Such additives can be mixed at a suitable time during the mixing of the components for forming the composite mixture. For example, the disclosed compositions can comprise one or more fillers, stabilizers, catalyst quenchers, tints, flame-retardants, impact modifiers, colorants, and/or mold release agents. In one aspect, the composition further comprises one or more optional additives selected from an antioxidant, flame retardant, inorganic filler, catalyst quencher, tint, and stabilizer. In another aspect, the composition further comprises a heat stabilizer, a catalyst quencher, or a tint, or a combination comprising at least one of the foregoing. The composition can be free of one or both of an antistatic agent and a flame retardant.

Heat stabilizers include, for example, organo phosphites such as triphenyl phosphite, tris-(2,6-dimethylphenyl)phosphite, tris(2,4-di-tert-butylphenyl) phosphite, tris-(mixed mono- and di-nonylphenyl)phosphite or the like; phosphonates such as dimethylbenzene phosphonate or the like, phosphates such as trimethyl phosphate, or the like, or combinations including at least one of the foregoing heat stabilizers. Heat stabilizers are generally used in amounts of 0.01 to 0.5 parts by weight based on 100 parts by weight of the total composition, excluding any filler. In one aspect, the heat stabilizer can be used in amounts of 0.0001 to 0.04 parts by weight based on 100 parts by weight of the total composition.

Antioxidants include, for example, organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)]methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations including at least one of the foregoing antioxidants. Antioxidants are generally used in amounts of 0.01 to 0.5 parts by weight, based on 100 parts by weight of the total composition, excluding any filler.

Tints include, for example, 1,8-Bis((4-methylphenyl)amino)-9,10-anthracenedione (violet); 1-(p-methylaniline)-4-hydroxy anthraquinone (violet); or Copper, (29H,31H-phthalocyaninato(2-)-appaN29,kappaN30,kappaN31, kappaN32)-, (SP-4-1)-(Blue).

Plasticizers include, for example, phthalic acid esters such as dioctyl-4,5-epoxy-hexahydrophthalate, tris-(octoxycarbonylethyl) isocyanurate, tristearin, epoxidized soybean oil or the like, or combinations including at least one of the foregoing plasticizers. Plasticizers are generally used in amounts of 0.5 to 3.0 parts by weight, based on 100 parts by weight of the total composition, excluding any filler.

Antistatic agents include, for example, sodium stearyl sulfonate, sodium dodecylbenzenesulfonate or the like, or combinations of the foregoing antistatic agents. In one aspect, carbon fibers, carbon nanofibers, carbon nanotubes, carbon black, or any combination of the foregoing can be used in a polymeric resin containing chemical antistatic agents to render the composition electrostatically dissipative. Likewise, the thermoplastic composition can be free of antistatic agents, e.g., can be free of sodium stearyl sulfonate, sodium dodecylbenzenesulfonate, carbon fibers, carbon nanofibers, carbon nanotubes, carbon black.

Lubricants include for example, fatty acid esters such as alkyl stearyl esters, e.g., methyl stearate or the like; mixtures of methyl stearate and hydrophilic and hydrophobic surfactants including polyethylene glycol polymers, polypropylene glycol polymers, and copolymers comprising at least one of the foregoing e.g., methyl stearate and polyethylene-polypropylene glycol copolymers in a suitable solvent; or combinations including at least one of the foregoing lubricants. Lubricants are generally used in amounts of 0.1 to 5 parts by weight, based on 100 parts by weight of the total composition, excluding any filler.

Blowing agents include for example, low boiling halohydrocarbons and those that generate carbon dioxide; blowing agents that are solid at room temperature and when heated to temperatures higher than their decomposition temperature, generate gases such as nitrogen, carbon dioxide, ammonia gas, such as azodicarbonamide, metal salts of azodicarbonamide, 4,4' oxybis(benzenesulfonylhydrazide), sodium bicarbonate, ammonium carbonate, or the like, or combinations including at least one of the foregoing blowing agents. Blowing agents are generally used in amounts of 1 to 20 parts by weight, based on 100 parts by weight of the total composition, excluding any filler.

Additionally, materials to improve flow and other properties can be added to the composition, such as low molecular weight hydrocarbon resins. Particularly useful classes of low molecular weight hydrocarbon resins are those derived from petroleum $C_5$ to $C_9$ feedstock that are derived from unsaturated $C_5$ to $C_9$ monomers obtained from petroleum cracking. Non-limiting examples include olefins, e.g. pentenes, hexenes, heptenes and the like; diolefins, e.g. pentadienes, hexadienes and the like; cyclic olefins and diolefins, e.g. cyclopentene, cyclopentadiene, cyclohexene, cyclohexadiene, methyl cyclopentadiene and the like; cyclic diolefin dienes, e.g., dicyclopentadiene, methylcyclopentadiene dimer and the like; and aromatic hydrocarbons, e.g. vinyltoluenes, indenes, methylindenes and the like. The resins can additionally be partially or fully hydrogenated.

In the present disclosure, the disclosed thermoplastic composition can exhibit, for example, maintained or improved mechanical, thermal, and morphological properties. In one aspect, thermoplastic composition maintains good mechanical properties while maintaining relatively low material costs.

In the present disclosure, low discoloration due to degradation and low surface defects due to the volatility of the additives is desirable. In a further aspect, the thermoplastic composition shows the reduction of aesthetic defects on the surface of the molded part. Previously, during processing, volatile compounds migrate to the surface of the thermoplastic composition, forming a solid deposit on the mold surface. As such, undesired marks on the surface of the final item can occur. In one aspect, the thermoplastic composition utilizes less volatile compounds, shows less solid deposits on the surface, and displays fewer marks on the surface.

In one aspect, the composition does not exhibit detectable surface vibration during extrusion. The surface vibration test involves a visual inspection of the sheet surface to determine whether the sheet shows waviness. This waviness is caused by vibrations of the sheet coming out of the calibrator. The vibrations are caused by surface defects originating on the extruded thermoplastic composition's top surface, due to an excessive sticking between the thermoplastic composition and the extruder calibrator.

The release property can be shown using the friction coefficient because the friction coefficient influences the demolding properties of injection-molded parts. In most injection molding processes the demolding force has to overcome a maximum friction force due to sticking of the part in the mold cavity (static friction coefficient) and sliding of the part out of the cavity on a lower sliding friction coefficient. Therefore, release performance is measured as friction force vs. cycle time and reported as a coefficient of friction. The mold release performance was evaluated using an injection molding machine Arburg 370 with a screw diameter of 25 millimeter (mm) and injection velocity 40 mm/second (s). The friction coefficient during demolding was measured at 300° C./100° C. Melt/Mold temperature. The test standard is UL International TTC GmbH.

In one aspect, the friction coefficient of the thermoplastic composition is less than 0.58. In another aspect, the friction coefficient of the thermoplastic composition is 0.1 to 0.5, for example, 0.25 to 0.5.

Plate-out is intended as the migration of a substance out of the polycarbonate bulk, during the processing, and as a consequence, deposits are formed on the surface of the extruded profile and/or die-head holes. In one aspect, the plate-out is less than 0.1 g. In another aspect, the plate-out is less than 0.05 g. In a further aspect, the plate-out is 0.001 g to 0.02 g.

In one aspect, the thermoplastic composition with GTS can be processed with the properties of the fatty acids with respect to flow, impact properties, visual aesthetics, and colorability of the polycarbonate polymer.

In one aspect, GTS allows the preparation of thermoplastic compositions with very low friction coefficient and lowered yellowness index while allowing sufficient flow for injection molding of relatively large parts (which is difficult with pure polycarbonate resins) and retaining practical impact.

Conventional thermoplastic compositions comprising polycarbonate are susceptible to color degradation over time. The parameters change (delta) yellowness index (dYi or dE) are commonly used parameters to measure color stability. These parameters also show the thermoplastic composition's heat aging stability. These parameters are typically evaluated using the thermoplastic composition at 120° C. for 5,000 hours. For this test, the yellowing indicates a worsening of the aging performance. In one aspect, the color stability of the thermoplastic composition shows a lower yellowness index (Yi) than the reference thermoplastic composition without a release agent. In another aspect, the Yi of the thermoplastic composition is less than 10, specifically, less than or equal to 5.

The flash point (Fp) determines the volatility of the release agent during the processing. The lower the flash point of the thermoplastic composition, the higher the possibility to plate out with surface defects as a result. In one aspect, the Fp or plate out is at least 250° C. In another aspect, the Fp or plate out is 250° C. to 400° C. In a further aspect, the Fp is 250° C. to 350° C.

In one aspect, the composition exhibits a notched izod impact energy that is equal to that exhibited by a molded article formed from an identical reference composition in the absence of a triacylglyceride release agent. In one aspect, the composition exhibits a notched izod impact energy that is at least 10% greater than that exhibited by a molded article formed from an identical reference composition in the absence of the triacylglyceride release agent. In another aspect, the composition exhibits a notched izod impact energy that is at least 100% greater than that exhibited by a molded article formed from an identical reference composition in the absence of the triacylglyceride release agent.

In one aspect, the molded article formed from the composition exhibits a percent ductility of 100% according to ASTM D256-2010. In another aspect, the molded article formed from the composition exhibits a percent ductility of at least 90% according to ASTM D256-2010. In a further aspect, the molded article formed from the composition exhibits a percent ductility of at least 80% according to ASTM D256-2010. In an even further aspect, the molded article formed from the composition exhibits a percent ductility of at least 50% according to ASTM D256-2010. The thermoplastic composition can have a notched Izod impact at −10° C. of greater than 40 kilojoules per meter squared ($kJ/m^2$), specifically, greater than 50 $kJ/m^2$ determined using a 3.2 mm thick, molded Izod notched impact (INI) bar per ASTM D256-2010.

The blended thermoplastic compositions, or compounds, disclosed herein provide robust plating performance while maintaining good mechanical properties (e.g., Izod impact strength higher than 400 Joules (J)/meter (m)). Evaluation of the mechanical properties can be performed through various tests, such as Izod test, Charpy test, Gardner test, etc., according to several standards (e.g., ASTM D256). Robustness of plating performance can be measured via a performance ranking, or plating ranking, ranging from top performance (e.g., "best") to bottom performance. The ranking can be partitioned in various levels. In one aspect, a plating ranking can have a level of "10" for top performance and a level of "0" for bottom performance.

The polycarbonate composition can have a light transparency of greater than 90% as determined using 3.2 mm thick samples using ASTM D1003-00, Procedure B using CIE standard illuminant C, with unidirectional viewing. Accordingly, when the polycarbonate composition has such a light transparency, it is herein referred to as an "optical grade" composition.

In one aspect, a method for making a thermoplastic composition comprising: (1) forming a blend composition comprising: (i) a polycarbonate polymer and (ii) a triacylglyceride release agent and (2) extruding the blend composition.

In one aspect, a method for making a thermoplastic composition comprising: (1) melt polymerizing polycarbonate; (2) extruding and melt filtering the polymerized polycarbonate; (3) forming a blend composition comprising: (i) the melt filtered polycarbonate polymer, (ii) a triacylglyceride release agent (such as glycerol tristearate, for example, in an amount of 0.03 to 0.05 wt % based on the total weight of the composition), and (iii) a UV stabilizer (such as a UV stabilizer under the tradename TINUVIN™ in an amount of 0.10 to 0.14 wt % based on the total weight of the composition); and (4) extruding the blend composition. The melt filtering the polycarbonate that occurs only prior to the forming the blend composition. The polymerized polycarbonate can have one or more of an endcap ratio of 65 to 71%, a branching level of 1000 to 1200 ppm by weight, an MVR of 5.5 to 7.5 g/10 min at 300° C./1.2 kg according to ASTM D1238-04 or ISO 1133, and a weight average molecular weight or a number average molecular weight of 13,000 to 15,000 g/mol (polystyrene basis or polycarbonate basis). The method can further comprise forming a multi-wall sheet from the blend composition.

In another aspect, the triacylglyceride release agent comprises glycerol tristearate.

In one aspect, the method comprises forming a molded article from the formed blend composition. In a further aspect, the molded article exhibits lower release forces during demolding of the parts than that exhibited by a molded article formed from an identical reference composition in the absence of the glycerol tristearate release agent. In another aspect, the molded article exhibits fewer aesthetic defects on the surface of the molded part than that exhibited by a molded article formed from an identical reference composition in the absence of the glycerol tristearate release agent.

In one aspect, the method comprises adding several additives to ensure a correct set of properties to the final product. The several additives can be combined in an additives package or can be added separately. The additives, for example, can include a heat stabilizer, a catalyst quencher, a tint, or a combination comprising at least one of the foregoing. In one aspect, the additives package can be added into the finishing extruder as a solid masterbatch. In another aspect, the additives can be fed to establish a correlation between the additive and the vibration. For example, several release agents and/or UV stabilizers have been fed to establish a correlation between release agent and vibrations.

In one aspect, the thermoplastic composition is extruded in the form of a sheet (e.g., a solid sheet or a multi-wall sheet). In another aspect, the extruded product is in the form of a film. In another aspect, the extrusion film grade is an application of this composition. In a further aspect, for extrusion the polymer has an endcap level [ratio of phenol endgroups to total endgroup amount in % (OH+Phenol)] higher than 50%, specifically, greater than 80%, more specifically, 80 to 95%. In a further aspect, the extrusion process is for at least three hours. In another aspect, the extrusion process is for at least ten hours. During the extrusion process, the extruded product can be observed looking for vibrations. Further, the plate-out of the extruded product can be monitored.

In one aspect, the materials produced are sent to an extrusion line to be used as a cap-layer on multi-wall sheets, top and bottom side.

In one aspect, an article of manufacture is formed from the blended composition. Further, the article of manufacture can be an injection molded part. In a further aspect, the article of manufacture is a large article, such as an airplane part. In one aspect, the article is an extruded part. In a yet further aspect, the article comprises an airplane part, electrical part, electronic application part, food service item part, medical device part, animal cage part, electrical connector part, enclosure for electrical equipment, electric motor part, power distribution equipment part, communication equipment part, computer part, and construction application part. In a further aspect, the extruded product is in the form of a solid sheet, a multi-wall sheet, or a film.

In one aspect, the molded article has a thickness of 1.2 mm to 2.0 mm. In a further aspect, the molded article has a thickness of 1.6 mm. In another aspect, the molded article has a thickness of 2.8 to 3.5 mm. For example, the molded article has a thickness of 3.2 mm.

Still further, the resulting composite mixture can be used to provide any desired shaped, formed, or molded articles. For example, the composite mixture is molded into useful shaped articles by a variety of means such as injection molding, extrusion, rotational molding, blow molding, thermoforming, and combinations comprising at least one of the foregoing. As noted above, the disclosed composites are particularly well suited for use in the manufacture of electronic components and devices. As such, according to some aspects, the disclosed composites can be used to form articles such as printed circuit board carriers, burn in test sockets, flex brackets for hard disk drives, and the like.

Formed articles include, for example, computer and business machine housings, home appliances, trays, plates, handles, helmets, automotive parts (such as instrument panels, cup holders, glove boxes, interior coverings), and the like. In various further aspects, formed articles include, but are not limited to, food service items, medical devices, animal cages, electrical connectors, enclosures for electrical equipment, electric motor parts, power distribution equipment, communication equipment, computers, and the like, where the devices can have molded in snap fit connectors. In a further aspect, articles comprise exterior body panels and parts for outdoor vehicles and devices including automobiles, protected graphics such as signs, outdoor enclosures such as telecommunication and electrical connection boxes, and construction applications such as roof sections, wall panels, and glazings. The article can be a multilayer article comprising the disclosed polycarbonates and can include articles which will be exposed to UV-light, whether natural or artificial, during their lifetimes, and can be outdoor articles; i.e., those intended for outdoor use. Suitable articles are exemplified by enclosures, housings, and panels, for example: parts for outdoor vehicles and devices; enclosures for electrical and telecommunication devices; outdoor furniture; aircraft components; boats and marine equipment, including trim, enclosures, and housings; outboard motor housings; depth finder housings, personal water-craft; jet-skis; pools; spas; hot-tubs; steps; step coverings; building and construction applications such as glazing, roofs, windows, floors, decorative window furnishings or treatments; treated glass covers for pictures, paintings, posters, and like display items; wall panels, and doors; protected graphics; outdoor and indoor signs; enclosures, housings, panels, and parts for automatic teller machines (ATM); enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; articles made from plastic-wood combinations; golf course markers; utility pit covers; computer housings; desktop computer housings; portable computer housings; lap-top computer housings; palm-held computer housings; monitor housings; printer housings; keyboards; facsimile machine housings; copier housings; telephone housings; mobile phone housings; radio sender housings; radio receiver housings; light fixtures; lighting appliances; network interface device housings; transformer housings; air conditioner housings; cladding or seating for public transportation; cladding or seating for trains, subways, or buses; meter housings; antenna housings; cladding for satellite dishes; coated helmets and personal protective equipment; coated synthetic or natural textiles; coated photographic film and photographic prints; coated painted articles; coated dyed articles; coated fluorescent articles; coated foam articles; and like applications.

In one aspect, the present disclosure pertains to articles comprising the disclosed blended polycarbonate compositions. In a further aspect, the article comprising the disclosed blended polycarbonate compositions is used in automotive applications. In a still further aspect, the article used in automotive applications is selected from instrument panels, overhead consoles, interior trim, center consoles, panels, quarter panels, rocker panels, trim, fenders, doors, deck lids, trunk lids, hoods, bonnets, roofs, bumpers, fascia, grilles, minor housings, pillar appliques, cladding, body side moldings, wheel covers, hubcaps, door handles, spoilers, window frames, headlamp bezels, headlamps, tail lamps, tail lamp housings, tail lamp bezels, license plate enclosures, roof racks, and running boards. In a yet further aspect, the article used in automotive applications is selected from seats, seat backs, cargo floors, door panels, steering wheels, radio speaker grilles, instrument panel bezels, steering columns, drip rails, energy absorbers, kick panels, mirror housings, grille opening reinforcements, steps, hatch covers, knobs, buttons, and levers. In an even further aspect, the article used in automotive applications is selected from seats, seat backs, cargo floors, door panels, steering wheels, radio speaker grilles, instrument panel bezels, steering columns, drip rails, energy absorbers, kick panels, mirror housings, grille opening reinforcements, steps, hatch covers, knobs, buttons, and levers. In an even further aspect, article is selected from instrument panels, overhead consoles, interior trim, center consoles, panels, quarter panels, rocker panels, trim, fenders, doors, deck lids, trunk lids, hoods, bonnets, roofs, bumpers, fascia, grilles, minor housings, pillar appliques, cladding, body side moldings, wheel covers, hubcaps, door handles, spoilers, window frames, headlamp bezels, headlamps, tail lamps, tail lamp housings, tail lamp bezels, license plate enclosures, roof racks, running boards, seats, seat backs, cargo floors, door panels, steering wheels, radio speaker grilles, instrument panel bezels, steering columns, drip rails, energy absorbers, kick panels, mirror housings, grille opening reinforcements, steps, hatch covers, knobs, buttons, and levers.

In various aspects, the disclosure relates to articles comprising a disclosed composition. In a further aspect, the article is used in electrical and electronic applications. In a still further aspect, the article is selected from components for cell phones and cell phone covers, components for batteries, components for computer housings, computer housings and business machine housings such as housings for monitors, handheld electronic device housings such as housings for cell phones, electrical connectors, and components of lighting fixtures, ornaments, home appliances, roofs, greenhouses, sun rooms, swimming pool enclosures, Light Emitting Diodes (LEDs) and light panels, extruded film and sheet articles, and the like. In a yet further aspect, the compositions are of particular utility in the manufacture of thin walled articles such as housings for electronic devices. In a still further aspect, additional examples of articles that can be formed from the compositions include electrical parts, such as relays, batteries, capacitors, and enclosures, consumer electronics such as enclosures and parts for laptops, desktops, docking stations, PDAs, digital cameras, desktops, and telecommunications parts such as parts for base station terminals.

EXAMPLES

The following examples are put forth so as to provide those of ordinary skill in the art with a complete disclosure and description of how the compositions disclosed and claimed herein can be made and evaluated, and are intended to be purely exemplary and are not intended to limit the disclosure. Unless indicated otherwise, parts are parts by weight, temperature is in ° C. or is at ambient temperature, and pressure is at or near atmospheric.

In the following examples, thermoplastic compositions of the present disclosure were manufactured and tested. In the following examples, PC 103R was employed as the high viscosity polycarbonate. PC 103R is a commercial product; a BPA polycarbonate resin made by a melt polymerization process with an MVR of 5-8 g/10 min at 300° C./1.2 kg according to ASTM D1238-04 or ISO 1133, available from SABIC's Innovative Plastics business.

Example 1

The high viscosity polycarbonate PC 103R was formulated with three different release agents:
a) pentaerythrityl tetrastearate (PETS), 0.1 to 0.4 wt %.
b) glycerol tristearate (GTS), 0.03 to 0.05 wt %.
c) poly-alpha olefin (PAO), 0.09 to 0.4 wt %.

Several lots were produced and sent to an extrusion line, in different periods of time, and then extruded in the form of multi-wall sheets. Each material was extruded for a minimum of 3 hours. Data on surface vibrations was gathered and analyzed.

Results:

Table 1 shows the data for several lots of the high viscosity polycarbonate for multi-wall sheets extrusion. Formulations containing release agents other than glycerol tristearate, showed surface vibrations, while those containing glycerol tristearate did not show surface vibrations.

TABLE 1

Table 1: Visual inspection results of surface vibrations on extruded profiles.

| Release Agent | Surface vibrations |
|---|---|
| PETS | Detected |
| GTS | Not detected |
| PAO | Detected |

Example 2

The high viscosity polycarbonate PC 103R was formulated with five different additive packages comprising one or more of the below listed release agents, UV stabilizers, and heat stabilizer.

Release agents:
a) Pentaerythrityl tetrastearate, 0.2 to 0.4 wt %.
b) Glycerol tristearate, 0.03 to 0.05 wt %. UV stabilizer a) UV1-2-[2-hydroxy-3,5-di(1,1-dimethylbenzylphenyl)]-2H-benzotriazole, 0.2 to 0.3 wt %.
b) UV2-2,2'-methylenebis(6-(2H-benzotriazol-2-yl)-4-(1,1,3,3-tetramethylbutyl)phenol), 0.1 to 0.18 wt %.
c) penta itol tetrakis(2-cyano-3,3-diphenylacrylate), 0.1 to 0.18 wt %.

Heat stabilizer: tris(2,4-di-tert-butylphenyl) phosphite (HS) 0.0075 to 0.03 wt %.

The materials produced were sent to an extrusion line and then used as a cap-layer on multi-wall sheets, top and bottom side. Each run lasted more than 10 hours, and the line settings remained unchanged during the run so as to have the same settings for all resins. The line was stopped after each resin for cleaning.

Results

Table 2 shows the impact of each release agent on surface vibrations, with the addition of the UV stabilizers. Glycerol tristearate based materials did not show any vibration on the sheet surface, while the other release agents showed vibrations on the sheet surface, even with the various UV stabilizers.

TABLE 2

Table 2: Visual inspection results of surface vibrations on extruded profiles.

| UV stabilizer | Heat stabilizer | Release agent | Surface vibrations |
|---|---|---|---|
| UV1 | HS | PETS | Detected |
| UV1 | HS | GTS | Not detected |
| UV3 | HS | PETS | Detected |
| UV3 | HS | GTS | Not detected |
| UV2 | HS | GTS | Not detected |

Example 3

TABLE 3

Composition of tested grades

| Resin | Release agent | UV | Antioxidant | Quencher |
|---|---|---|---|---|
| Standard PC 103R | PETS 0.4 wt % | UV5411 0.17 wt % | Irgafos 168 0.0075% | Butyl Tosilate 0.0002 wt % |
| Reformulated PC 103R | GTS 0.04 wt % | Tin360 0.15 wt % | Irgafos 168 0.0075% | Butyl Tosilate 0.0002 wt % |

UV5411 is 2-(2H-benzotriazol-2-yl)-4-(1,1,3,3-tetramethylbutyl)-phenol (CYASORB™ 5411). Tin360 is a commercially available UV absorber.

The formulations of Table 3 were tested and the results were set forth below in Table 4. The plate-out is the migration of a substance out of the polycarbonate bulk, during the processing, and as a consequence, deposits are formed on the surface of the extruded profile and/or die-head holes.

Plate-out is determined by determining a stamper weight after 8000 shots, cleaning the stamper, and washing the deposit from the stamper surface. After cleaning, the stamper weight is again determined and the plate-out or the weight of the deposit is equal to the weight before cleaning minus the weight after cleaning. The plate-out is determined using a sample that it contains less than or equal to 200 ppm of water.

TABLE 4

Table 4: composition data of standard PC103R with PETS + UV5411 vs. reformulated PC103R with GTS and Tin360.

| Resin | Production time [hrs] | Plate-out amount [g] | Remarks |
|---|---|---|---|
| PETS + UV5411 | 10.5 | >0.100 | Vibrations |
| GTS + Tin360 | 10.5 | 0.019 | No vibrations |

Examples 4-7: Impact Retention

Notched Izod impact tests were performed on polycarbonate compositions with different release agents at various temperatures using a 3.2 mm thick, molded notched Izod impact bar per ASTM D256-2010. The results are shown in Table 5, where D denotes ductile samples with notched Izod impact values of greater than 50 kJ/m$^2$, B denotes brittle samples with notched Izod impact values of less than 30 kJ/m$^2$, DB denotes samples with notched Izod impact values of 40 to 50 kJ/m$^2$, and BD denotes samples with notched Izod impact values of 30 to 40 kJ/m$^2$. Notched Izod Impact Strength is used to compare the impact resistances of plastic materials and was determined.

TABLE 5

| | Example | | | |
|---|---|---|---|---|
| | 4 | 5 | 6 | 7 |
| Release agent | | | | |
| PETS (wt %) | 0.5 | 0.4 | — | — |
| GTS (wt %) | — | 0.1 | — | 0.4 |
| PAO (wt %) | — | — | 0.6 | — |
| Notched Izod Impact Properties | | | | |
| At −10° C. | BD | DB | B | D |
| At −5° C. | D | D | DB | D |
| At 0° C. | D | D | D | D |
| At 5° C. | D | D | D | D |
| At 10° C. | D | D | D | D |

Table 5 shows that compositions comprising a combination of GTS and PETS have improved impact properties at low temperatures, where Example 5 comprising PETS and GTS has improved properties at −10° C. as compared to Example 4 comprising only PETS. Table 5 further shows that Example 7 comprising only GTS as the release agent is ductile over all temperatures.

In an embodiment, a thermoplastic composition can comprise: a polycarbonate polymer; and a triacylglyceride release agent.

Set forth below are some of the embodiments of the present composition, methods of making the same, and articles made therefrom.

Embodiment 1: a thermoplastic composition comprising: a melt polycarbonate polymer; and 0.01 to 0.05 weight percent of a release agent based on the total weight of the composition, wherein the release agent comprises triacylglyceride, and wherein the composition is free of stearyl stearate, glycerol monostearate, and pentaerythrityl tetrastearate.

Embodiment 2: a thermoplastic composition comprising: a melt polycarbonate, wherein the melt polycarbonate has an endcap ratio of 65 to 71%; 0.03 to 0.05 weight percent of a release agent based on the total weight of the composition, wherein the release agent comprises triacylglyceride; and 0.10 to 0.14 weight percent of a UV stabilizer based on the total weight of the composition.

Embodiment 3: the composition of any of claims 1-2, wherein the composition is free of stearyl stearate, glycerol monostearate, and pentaerythrityl tetrastearate.

Embodiment 4: the composition of any of claims 1-3, wherein the polycarbonate polymer has a branching level of 1000 to 1200 ppm by weight.

Embodiment 5: the composition of any of claims 1-4, wherein the polycarbonate polymer has an MVR of 5.5 to 7.5 g/10 min at 300° C./1.2 kg according to ASTM D1238-04.

Embodiment 6: the composition of any of claims 1-5, wherein the polycarbonate polymer has a weight average molecular weight of 28,000 to 30,000 or 13,000 to 18,000 g/mol (polycarbonate basis).

Embodiment 7: the composition of any of claims 1-6, wherein the release agent is the triacylglyceride.

Embodiment 8: the composition of any of claims 1-7, wherein the composition is free of a release agent that is not the triacylglyceride.

Embodiment 9: the composition of any of claims 1-8, wherein the blend composition has a plate-out measurement of less than 0.1 g during extrusion.

Embodiment 10: the composition of any of claims 1-9, wherein the triacylglyceride release agent comprises glycerol tristearate.

Embodiment 11: the composition of any of claims 1-10, wherein the UV stabilizer comprises 2-[2-hydroxy-3,5-di(1,1-dimethylbenzylphenyl)]-2H-benzotriazole; 2,2'-methylenebis(6-(2H-benzotriazol-2-yl)-4-(1,1,3,3-tetramethylbutyl)phenol); 2-(2H-benzotriazol-2-yl)-p-cresol; pentaerythritol tetrakis(2-cyano-3,3-diphenylacrylate); 2-(2H-benzotriazol-2-yl)-4-(1,1,3,3-tetramethylbutyl)-phenol; or a combination comprising at least one of the foregoing.

Embodiment 12: the composition of any of claims 1-11, wherein the UV stabilizer comprises 2-(2H-benzotriazol-2-yl)-p-cresol.

Embodiment 13: The composition of any of claims 1-12, wherein the composition further comprises, a heat stabilizer, a catalyst quencher, a tint, or a combination comprising at least one of the foregoing.

Embodiment 14: the composition of any of claims 1-13, wherein the composition has a light transparency of greater than 90% as determined using 3.2 mm thick samples using ASTM D1003-00, Procedure B using CIE standard illuminant C, with unidirectional viewing.

Embodiment 15: a method for making a thermoplastic composition, comprising: forming the composition of any of claims 1-14, wherein the composition is a blend composition; and extruding the composition.

Embodiment 16: a method for making a thermoplastic composition, comprising: melt polymerizing a polycarbonate, extruding and melt filtering the polycarbonate to form a melt filtered polycarbonate; forming the thermoplastic composition comprising the melt filtered polycarbonate, 0.03 to 0.05 wt % of a triacylglyceride release agent; and 0.10 to 0.14 wt % of a UV stabilizer; wherein the weight percentages are based on the total weight of the composition; and extruding the thermoplastic composition.

Embodiment 17: the method of any of Embodiment 1, further comprising forming a multi-wall sheet from the thermoplastic composition.

Embodiment 18: the method of any of the Embodiments 15-17, wherein the composition is free of stearyl stearate, glyceryl monostearate, and pentaerythrityl tetrastearate.

Embodiment 19: the method of any of the Embodiments 15-18, wherein the polycarbonate has a branching level of 1000 to 1200 ppm by weight and/or wherein the polycarbonate has an MVR of 5.5 to 7.5 g/10 min at 300° C./1.2 kg according to ASTM D1238-04.

Embodiment 20: the method of any of the Embodiments 15-19, wherein the composition is free of a release agent other than the triacylglyceride.

Embodiment 21: the method of any of the Embodiments 15-20, wherein the triacylglyceride release agent comprises glycerol tristearate.

Embodiment 22: the method of any of the Embodiments 15-21, wherein the UV stabilizer comprises 2-(2H-benzotriazol-2-yl)-p-cresol.

Embodiment 23: the method of any of the Embodiments 15-22, wherein the composition has a light transparency of greater than 90% as determined using 3.2 mm thick samples using ASTM D1003-00, Procedure B using CIE standard illuminant C, with unidirectional viewing.

Embodiment 24: the method of any of the Embodiments 15-23, wherein the blend composition does not exhibit visually detectable surface vibration as waviness during extrusion.

Embodiment 25: the method of any of the Embodiments 15-24, comprising only melt filtering the melt polycarbonate prior to adding any triacylglyceride.

Embodiment 26: the method of any of the Embodiments 15-25, wherein the polycarbonate has one or more of an endcap ratio of 65 to 71%, a branching level of 1000 to 1200 ppm by weight, an MVR of 5.5 to 7.5 g/10 min at 300° C./1.2 kg according to ASTM D1238-04 or ISO 1133, a number average molecular weight of 20,000 to 60,000 g/mol (polystyrene basis), and a weight average molecular weight of 40,000 to 80,000 g/mol (polystyrene basis).

Embodiment 27: the method of any of Embodiments 15-26, wherein the composition does not exhibit visually detectable surface vibration as waviness during extrusion.

Embodiment 18: the method of any of Embodiments 15-27, wherein extruding the composition forms a product in the form of a solid sheet, a multi-wall sheet, or a film.

Embodiment 29: the method of any of Embodiments 15-28, further comprising forming a molded article from the composition.

Embodiment 30: the method of any of Embodiments 15-29, further comprising melt filtering the melt polycarbonate prior to adding any triacylglyceride.

Embodiment 31: the method of any of Embodiments 15-30, comprising only melt filtering the melt polycarbonate prior to adding any triacylglyceride.

Embodiment 32: an article of manufacture formed from the composition of any of Embodiments 1-14 or from the method of any of Embodiments 15-31.

Embodiment 33: the article of Embodiment 32, wherein the article comprises an airplane part, electrical part, electronic application part, food service item part, medical device part, animal cage part, electrical connector part, enclosure for electrical equipment, electric motor part, power distribution equipment part, communication equipment part, computer part, or construction application part.

Embodiment 34: the article of any of Embodiments 32-33, wherein the article is a multi-wall sheet.

Embodiment 35: the article of Embodiment 34, wherein the multi-wall sheet comprises greater than or equal to two transverse layers and a rib extending from one of the transverse layers to an adjacent transverse layer.

What is claimed is:

1. A method for making a thermoplastic composition, comprising:
   melt polymerizing a polycarbonate,
   extruding and melt filtering the polycarbonate to form a melt filtered polycarbonate;
   forming the thermoplastic composition comprising
     the melt filtered polycarbonate,
     0.03 to 0.05 wt % of a triacylglyceride release agent; and
     0.10 to 0.14 wt % of a UV stabilizer;
     wherein the weight percentages are based on the total weight of the composition; and
   extruding the thermoplastic composition.

2. The method of claim 1, further comprising forming a multi-wall sheet from the thermoplastic composition.

3. The method of claim 1, wherein the composition is free of stearyl stearate, glycerol monostearate, and pentaerythrityl tetrastearate.

4. The method of claim 1, wherein the polycarbonate has a branching level of 1000 to 1200 ppm by weight and/or wherein the polycarbonate has an MVR of 5.5 to 7.5 g/10 min at 300° C./1.2 kg according to ASTM D1238-04.

5. The method of claim 1, wherein the composition is free of a release agent other than the triacylglyceride.

6. The method of claim 1, wherein the triacylglyceride release agent comprises glycerol tristearate.

7. The method of claim 1, wherein the UV stabilizer comprises 2-(2H-benzotriazol-2-yl)-p-cresol.

8. The method of claim 1, wherein the composition has a light transparency of greater than 90% as determined using 3.2 mm thick samples using ASTM D1003-00, Procedure B using CIE standard illuminant C, with unidirectional viewing.

9. The method of claim 1, wherein the blend composition does not exhibit visually detectable surface vibration as waviness during extrusion.

10. The method of claim 1, comprising only melt filtering the melt polycarbonate prior to adding any triacylglyceride.

11. The method of claim 1, wherein the polycarbonate has an endcap ratio of 65 to 71%.

12. The method of claim 1, wherein the melt polycarbonate has an endcap level of greater than 50%, or greater than 80%, or 80% to less than 100%, or 85% to 95%.

13. An article of manufacture formed from the composition made by the method of claim 1.

14. The article of claim 13, wherein the article is a multi-wall sheet.

15. The article of claim 14, wherein the multi-wall sheet comprises greater than or equal to two transverse layers and a rib extending from one of the transverse layers to an adjacent transverse layer.

16. The article of claim 13, wherein the article comprises an airplane part, electrical part, electronic application part, food service item part, medical device part, animal cage part, electrical connector part, enclosure for electrical equipment, electric motor part, power distribution equipment part, communication equipment part, computer part, or construction application part.

17. The method of claim 1, wherein the polycarbonate has a branching level of 1,000 to 1,200 ppm by weight.

18. The method of claim 1, wherein the polycarbonate has an MVR of 5.5 to 7.5 g/10 min at 300° C./1.2 kg according to ASTM D1238-04 or ISO 1133.

19. The method of claim 1, wherein the polycarbonate has a number average molecular weight of 20,000 to 60,000 g/mol (polystyrene basis).

20. The method of claim 1, wherein the polycarbonate has a weight average molecular weight of 40,000 to 80,000 g/mol (polystyrene basis).

* * * * *